US011908363B2

(12) United States Patent
Li et al.

(10) Patent No.: US 11,908,363 B2
(45) Date of Patent: Feb. 20, 2024

(54) SELF-ADAPTIVE DISPLAY ASPECT RATIO ADJUSTER AND GESTURE ON ROLLING DEVICES (71) Applicant: HUAWEI TECHNOLOGIES CO., LTD., Guangdong (CN)

(72) Inventors: Ming Li, Helsinki (FI); Jue Li, Helsinki (FI)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/767,539

(22) PCT Filed: Feb. 14, 2020

(86) PCT No.: PCT/EP2020/053851
§ 371 (c)(1),
(2) Date: Apr. 8, 2022

(87) PCT Pub. No.: WO2021/160278
PCT Pub. Date: Aug. 19, 2021

(65) Prior Publication Data
US 2023/0076158 A1    Mar. 9, 2023

(51) Int. Cl.
*G09G 3/00*    (2006.01)
*H04M 1/02*    (2006.01)
*G06F 3/04883*    (2022.01)

(52) U.S. Cl.
CPC ......... *G09G 3/035* (2020.08); *G06F 3/04883* (2013.01); *H04M 1/0268* (2013.01);
(Continued)

(58) Field of Classification Search
CPC ........................ G09G 3/035; G09G 3/04883
(Continued)

(56) References Cited

U.S. PATENT DOCUMENTS

| 2005/0176470 A1* | 8/2005 | Yamakawa | ......... H04M 1/0268 455/566 |
| 2009/0051830 A1* | 2/2009 | Matsushita | ........... G06F 1/1624 361/679.05 |
| 2010/0167791 A1* | 7/2010 | Lim | .................... H04M 1/0266 455/566 |

(Continued)

FOREIGN PATENT DOCUMENTS

| EP | 1970886 B1 | 6/2015 |
| EP | 3322160 A1 | 5/2018 |

(Continued)

OTHER PUBLICATIONS

Notice of Reasons for Rejection for Application No. 2022-520110 dated Apr. 4, 2023, 10 pages.

(Continued)

*Primary Examiner* — Prabodh M Dharia (57) ABSTRACT

A device and method for intuitively optimizing the size of a displayed visual content on a rollable display device, wherein either the visual content is optimally scaled to current dimensions of a front screen, or a touch-sensitive display is rolled to a required extent that optimally displays a best possible aspect ratio for the visual content after obtaining a permission using an input gesture, such as a multi-touch "spread" or "pinch" gesture. The touch-sensitive display can further be rolled manually between a rolled-in and rolled-out state using "shake-to-roll" movement gestures.

13 Claims, 4 Drawing Sheets (52) U.S. Cl.
CPC ............... *G09G 2340/0442* (2013.01); *G09G 2340/0492* (2013.01); *G09G 2354/00* (2013.01)

(58) Field of Classification Search
USPC .................. 345/156, 173; 455/566; 715/773; 359/280
See application file for complete search history.

(56) References Cited

U.S. PATENT DOCUMENTS

| | | | | |
|---|---|---|---|---|
| 2013/0314762 | A1* | 11/2013 | Kwack | G09F 9/30 359/280 |
| 2014/0009387 | A1* | 1/2014 | Hwang | G06F 1/1694 345/156 |
| 2014/0298237 | A1* | 10/2014 | Galu, Jr. | G06F 3/04883 715/773 |
| 2014/0320434 | A1* | 10/2014 | Pantel | G06F 3/017 345/173 |
| 2015/0261376 | A1* | 9/2015 | Kim | G06F 3/04883 345/173 |
| 2015/0346834 | A1* | 12/2015 | Martinez Fernandez | G06F 3/017 340/12.5 |
| 2016/0034047 | A1 | 2/2016 | Lee et al. | |
| 2017/0011714 | A1* | 1/2017 | Eim | G06F 1/1677 |
| 2018/0198899 | A1 | 7/2018 | Lee | |
| 2019/0155492 | A1 | 5/2019 | Woo et al. | |
| 2019/0197960 | A1 | 6/2019 | Kim | |
| 2021/0201722 | A1* | 7/2021 | Jeong | G09F 9/301 |

FOREIGN PATENT DOCUMENTS

| | | |
|---|---|---|
| EP | 3503537 A1 | 6/2019 |
| EP | 2759922 B1 | 9/2021 |
| JP | 2011034087 A | 2/2011 |
| JP | 2013242530 A | 12/2013 |
| JP | 2014146337 A | 8/2014 |
| JP | 2014215916 A | 11/2014 |
| JP | 2016505877 A | 2/2016 |
| JP | 2016035787 A | 3/2016 |
| KR | 20170012628 A | 2/2017 |
| WO | 2017090823 A1 | 6/2017 |

OTHER PUBLICATIONS

International Search Report and Written Opinion issued in PCT/EP2020/053851, dated Oct. 22, 2020, 15 pages.

\* cited by examiner

SELF-ADAPTIVE DISPLAY ASPECT RATIO ADJUSTER AND GESTURE ON ROLLING DEVICES

CROSS-REFERENCE TO RELATED APPLICATIONS

This application is a National Stage of International Application No. PCT/EP2020/053851, filed on Feb. 14, 2020, which is hereby incorporated by reference in its entirety.

TECHNICAL FIELD

The disclosure relates generally to flexible display devices, more particularly to methods and devices for adjusting the aspect ratio or size of a display or displayed content on a rollable display device.

BACKGROUND

Consumer interest in large and bright display devices and therefore demand for display devices that are conveniently portable and stored is increasing. A flexible display panel provides a solution for portability using a display panel in which a plurality of pixels are disposed on a flexible substrate such as a plastic film instead of a rigid substrate, and thus may be easily bent.

Accordingly, in recent years flexible display devices have been developed that use a flexible display panel, such as rollable display devices, foldable display devices, expandable display devices and the like. Rollable display devices comprise a flexible display panel that may be expanded to increase usable screen area and may be rolled in to a compact position to increase portability, using a roll unit for supporting a curved portion of the flexible display panel to be rolled around the roll unit, and a driving module for rotating the roll unit in response to a driving signal. Some rollable display devices include a touch-sensitive flexible display panel that can also function as input device by detecting touch gestures.

A problem with such rollable display devices is however that it is difficult to provide intuitive control options for optimizing usable screen area according to a size and aspect ratio of a displayed visual content (such as a video stream) and to easily disable or enable rolling of the display on request. Such control options could traditionally be placed on the side of a device (similarly to audio output volume controls), however the side of the device in rollable display devices forms part of the flexible display panel and is therefore not fixed. Using the touch-sensitive display panel itself for input detection for enabling display rolling or adjusting the display size further presents a problem of the user accidentally rolling in or rolling out the display by involuntarily touching the display in the dedicated region.

There are several ways in which the aforementioned problems have been attempted to be solved by existing prior art. However, they are still associated with certain disadvantages.

According to one solution, the screen size of a flexible display can be adjusted by driving a motor and a moving member, according to a screen ratio of a displayed content and vice versa, wherein the screen size of the flexible display may be increased or reduced by physically moving (e.g. waving, shaking) a remote controller. However, this solution does not disclose any permission request requiring user gestures for changing the screen size. In addition, no information is provided regarding how exactly such moving (e.g. waving, shaking) can be used to change the screen size of the flexible display.

According to another solution, a flexible device may include a flexible display which may be deformed via folding, bending, or rolling and can provide a user interface screen in which a visual representation dynamically varies in interaction with the deformation of the flexible display (for example, sizes of displayed objects may vary with degree of deformation). Such a flexible device may improve user readability by adjusting the ratio or size of an activation area on the flexible display, in the interaction with the deformation degree or state of the flexible device. Furthermore, the flexible display of such a flexible device can be attached to a rotation roller and can be moved via a motion input of one, two or three dimensions (e.g. shaking) in a predefined direction, which motion input can be sensed via a motion sensing module including at least one motion sensor (for example, accelerometer). However, this solution does not disclose deforming the flexible screen according to a best possible aspect ratio after obtaining a user's permission, nor that the shaking motion of the flexible device would correspond to rolling of the flexible display.

Thus, a need still exists to provide a solution that enables dynamically adjusting aspect ratio of a visual content displayed on a rollable display for optimizing aspect ratio of the visual content according to front dimensions of the rollable display, and that further enables a user to provide intuitive input for enabling or disabling rolling in and rolling out the rollable display to avoid involuntary or accidental adjustments of the display.

SUMMARY

It is therefore an object to provide a method and device for detecting a user gesture on a rollable display device for adjusting the aspect ratio or size of a display or displayed content which overcomes or at least reduces the problems mentioned above.

The foregoing and other objects are achieved by the features of the independent claims. Further implementation forms are apparent from the dependent claims, the description and the figures.

According to a first aspect, there is provided a device comprising:
a housing;
a roll unit mounted in the housing and configured to be rotatable around a roll axis;
a flexible, touch-sensitive display configured to be rolled around the roll unit and thereby define a planar front screen with a fixed first dimension and a second dimension that changes according to a degree of rotation of the roll unit; and
a controller configured to control the display to display a visual content on the front screen, and to adapt at least one dimension of the visual content to match a corresponding dimension of the front screen.

Adapting a dimension of a visual content to match a corresponding dimension of the front screen of a rollable display device provides a simple and dynamic method for improving a user's viewing experience by automatically accommodating and optimizing for different sizes and screen ratios of visual content rendered on a rollable touch-sensitive display, without requiring any special hardware additions to the device itself. The method thus allows for rolling the display in and out without any visual UI element (such as slider toggle, clickable icon, and the like) or physical user interaction element (such as hardware buttons, scrolling wheels, and the like). The aspect ratio of the visual content can be changed to conform to endless aspect ratio options, including new aspect ratios which may arise in the future. Moreover, this allows for full utilization of bezel-less displays in a manner that there are no black bars on any edge of the displays, which could provide users with the best possible visual experience.

In a possible implementation form of the first aspect the controller is configured to adapt a size of the visual content to match a size of the front screen by adjusting an aspect ratio of the visual content so that both dimensions of the visual content match a corresponding first dimension and second dimension of the front screen, thereby maximizing the usable display area of the rollable display device.

In a further possible implementation form of the first aspect the controller is configured to calculate an optimal second dimension of the front screen for displaying the visual content based on the fixed first dimension, an orientation of the display, and an aspect ratio of the visual content; and to adjust the second dimension of the front screen, by causing a rotation of the roll unit, to the optimal second dimension, thereby optimizing aspect ratio of the visual content by adjusting the size and aspect ratio of the front screen.

In a further possible implementation form of the first aspect the controller is configured to, in response to detecting a user input, selectively enable or disable rotation of the roll unit for adjusting the second dimension, thereby limiting accidental input and false front screen size adjustments.

In a further possible implementation form of the first aspect the touch-sensitive display is configured detect touch gestures and the user input comprises a touch gesture detected on the front screen.

In a further possible implementation form of the first aspect the touch gesture comprises a sliding movement of a plurality of touch inputs detected simultaneously on the front screen; wherein the controller is further configured to in response to detecting a pinch gesture comprising a sliding movement of the plurality of touch inputs towards each other, enable rotation of the roll unit for adjusting the second dimension, and in response to detecting a spread gesture comprising a sliding movement of the plurality of touch inputs away from each other, disable rotation of the roll unit for adjusting the second dimension.

Limiting the type of touch gesture to a plurality of simultaneously detected touch inputs with a predefined sliding movement enables avoiding accidental adjustments by the user in case of involuntarily touching of the display or simply holding the device.

In a further possible implementation form of the first aspect the device further comprises an accelerometer connected to the controller and configured to detect movement gestures of the display; wherein the front screen is configured to be adjusted by the controller between a rolled-in state wherein the second dimension is minimal, and a rolled-out state wherein the second dimension is maximal; and wherein the controller is further configured to in response to detecting a first movement gesture by the accelerometer, adjust the front screen to a rolled-out state, and in response to detecting a second movement gesture by the accelerometer, adjust the front screen to a rolled-in state.

Defining a movement gesture for rolling in and rolling out the rollable display provides an intuitive user input option without requiring additional hardware or usage of the display area. In addition, the movement gesture is a low power consumption solution as it only requires an accelerometer for sensing occurrence of the gesture.

In an embodiment the first movement gesture comprises: a first sub-gesture of arranging the display in a horizontally upwards state, and a second clockwise sub-gesture of shaking the display by rotating in a clockwise direction around an axis parallel to the roll axis while keeping the display upwards and returning the display to the horizontally upwards state; and the second movement gesture comprises the first sub-gesture, and a second counter-clockwise sub-gesture of shaking the display by rotating in a counter-clockwise direction around an axis parallel to the roll axis while keeping the display upwards and returning the display to the horizontally upwards state.

This "shake-to-roll" gesture is intuitive and bidirectional, thus allows for a bidirectional control of rolling of the rollable touch-sensitive display.

In a further possible implementation form of the first aspect the controller is configured to detect a time interval Td elapsed between the first sub-gesture and the respective second clockwise sub-gesture or second counter-clockwise sub-gesture, and to only interpret the first movement gesture and the second movement gesture as valid if the time interval Td is equal or shorter than a predefined time threshold Tr.

This allows to further limit accidental input and false front screen size adjustments.

In a further possible implementation form of the first aspect the roll unit further comprises a gear arranged on both ends of the roll unit for engaging the display; and a reversible drive unit configured to rotate the roll unit around the roll axis in response to control signals received from the controller, the control signals comprising instructions defining a direction and an extent of the rotation.

In an embodiment the drive unit is an electric motor configured to further adjust a rotational speed of the roll unit in proportion to an input voltage.

In a further possible implementation form of the first aspect the device is a smart device, preferably a smartphone, and wherein the visual content is displayed as part of a graphical user interface of application running on the smart device.

In an embodiment the visual content is video content with a fixed aspect ratio.

According to a second aspect, there is provided a method for controlling a rolling display device, the rolling display device comprising a controller, a housing, a roll unit mounted in the housing and configured to be rotatable around a roll axis, and a flexible, touch-sensitive display rolled around the roll unit thereby defining a planar front screen with a with a fixed first dimension and a second dimension that changes according to a degree of rotation of the roll unit, the method comprising: detecting, by the controller, a current second dimension of the front screen; adapting at least one dimension of a visual content to be displayed on the front screen to match a corresponding dimension of the front screen; and displaying the visual content on the front screen.

Adapting a dimension of a visual content to match a corresponding dimension of the front screen of a rollable display device provides a simple and dynamic method for improving a user's viewing experience by automatically accommodating and optimizing for different sizes and screen ratios of visual content rendered on a rollable touch-sensitive display, without requiring any special hardware additions to the device itself. The method thus allows for rolling the display in and out without any visual UI element (such as slider toggle, clickable icon, and the like) or physical user interaction element (such as hardware buttons, scrolling wheels, and the like). The aspect ratio of the visual content can be changed to conform to endless aspect ratio options, including new aspect ratios which may arise in the future. Moreover, this allows for full utilization of bezel-less displays in a manner that there are no black bars on any edge of the displays, which could provide users with the best possible visual experience.

In a possible implementation form of the second aspect the method further comprises:
calculating, by the controller, an optimal second dimension for displaying the visual content based on the fixed first dimension, an orientation of the display, and an aspect ratio of the visual content; and
adjusting the second dimension of the front screen, by rotating the roll unit, to the optimal second dimension.

This enables further optimizing aspect ratio of the visual content by adjusting the size and aspect ratio of the front screen.

In a further possible implementation form of the second aspect the touch-sensitive display is configured detect touch gestures, and the method further comprises:
detecting a touch gesture comprising a simultaneous sliding movement of a plurality of touch inputs on the front screen; and
selectively enabling or disabling rotation of the roll unit for adjusting the second dimension based on the touch gesture, wherein
in response to detecting a pinch gesture comprising a sliding movement of the plurality of touch inputs towards each other, rotation of the roll unit is enabled, and
in response to detecting a spread gesture comprising a sliding movement of the plurality of touch inputs away from each other, rotation of the roll unit is disabled.

Limiting the type of touch gesture to a plurality of simultaneously detected touch inputs with a predefined sliding movement enables avoiding accidental adjustments by the user in case of involuntarily touching of the display or simply holding the device.

In a further possible implementation form of the second aspect the rolling display device further comprises an accelerometer connected to the controller, and the method further comprises: detecting a first movement gesture or a second movement gesture by the accelerometer; and
adjusting the front screen by the controller between a rolled-in state wherein the second dimension is minimal, and a rolled-out state wherein the second dimension is maximal; wherein
in response to detecting a first movement gesture by the accelerometer, the front screen is adjusted to a rolled-out state, and
in response to detecting a second movement gesture by the accelerometer, the front screen is adjusted to a rolled-in state.

Defining a movement gesture for rolling in and rolling out the rollable display provides an intuitive user input option without requiring additional hardware or usage of the display area. In addition, the movement gesture is a low power consumption solution as it only requires an accelerometer for sensing occurrence of the gesture.

In an embodiment the first movement gesture comprises: a first sub-gesture of arranging the display in a horizontally upwards state, and a second clockwise sub-gesture of shaking the display by rotating in a clockwise direction around an axis parallel to the roll axis while keeping the display upwards and returning the display to the horizontally upwards state; and
wherein the second movement gesture comprises
a first sub-gesture of arranging the display in a horizontally upwards state, and
a second counter-clockwise sub-gesture of shaking the display by rotating in a counter-clockwise direction around an axis parallel to the roll axis while keeping the display upwards and returning the display to the horizontally upwards state.

This "shake-to-roll" gesture is intuitive and bidirectional, thus allows for a bidirectional control of rolling of the rollable touch-sensitive display.

In a further possible implementation form of the second aspect the method further comprises: detecting a time interval Td elapsed between the first sub-gesture and the respective second clockwise sub-gesture or second counter-clockwise sub-gesture; and
interpreting the first movement gesture and the second movement gesture as valid only if the time interval Td is equal or shorter than a predefined time threshold Tr.

This enables further optimizing aspect ratio of the visual content by adjusting the size and aspect ratio of the front screen.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 1:
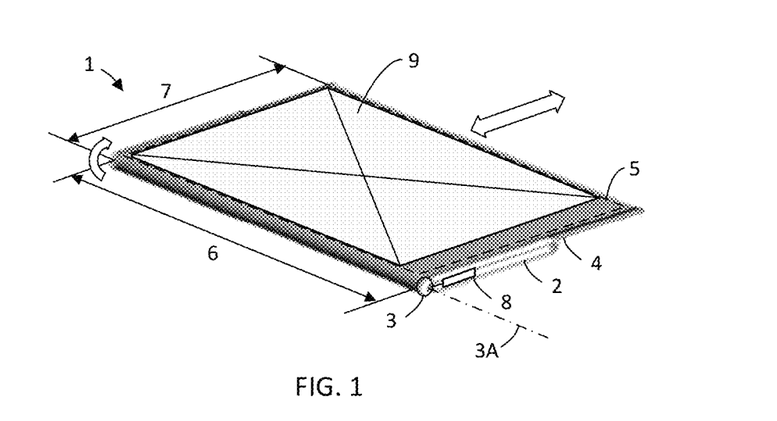
FIG. 1 shows an isometric view of a rolling display device in accordance with an embodiment of the first aspect.

FIG. 1 illustrates a rolling display device 1 in accordance with the present disclosure. Rollable display devices are defined by comprising a flexible display panel that may be expanded by rolling out, around a roll unit that usually comprises one or more gears engaging the flexible display, to increase its usable (front) screen area and may be rolled in to a compact position to increase portability, using the roll unit for supporting a curved portion of the flexible display panel, and a driving module for rotating the roll unit in response to a driving signal. In other words, If a rollable touch-sensitive display is rolled in, the device (such as a smartphone) has both front and back screens. These front and back screens can be used either separately or coherently depending on the usage scenario. If the rollable touch-sensitive display is rolled out to its maximum extent, users can take use of the entire rollable touch-sensitive display.

Rollable display devices may comprise a touch-sensitive flexible display panel that can also function as input device by detecting touch gestures. In some embodiments the touch-sensitive flexible display panels use multi-touch technology that enables the display panels to recognize the presence of more than one point of contact with the screen surface, whereby a multi-touch gesture in this case is made by multiple points of contact (e.g. a finger of a user) touching the rollable touch-sensitive display with or without an accompanying movement of the points of contact (fingers) on the display. These multi-touch gestures help users perform tasks quickly and intuitively on e.g. mobile devices.

The device 1 according to the disclosure comprises a housing 2 and a roll unit 3 rotatably mounted in the housing 2. The device 1 further comprises a flexible, touch-sensitive display 4 that is configured to be rolled around the roll unit 3 and thereby to define a planar front screen 5 with a fixed first dimension 6 and a second dimension 7 that changes according to a degree of rotation of the roll unit 3. In other words, as the display 4 is rolled around the roll unit 3 (e.g. between a rolled-in and a rolled-out state), its front area facing upwards towards a user (the front screen 5) changes accordingly.

When rotating the roll unit 3 clockwise the second dimension 7 of the front screen 5 increases and, in contrast, when rotating the roll unit 3 counter-clockwise the second dimension 7 of the front screen 5 decreases in a linear correlation with the degree of rotation of the roll unit 3. Since the first dimension 6 of the front screen 5 is fixed, an increase or decrease of the second dimension 7 results in a change in size of the front screen 5 accordingly.

The device 1 further comprises a controller 8 connected to the roll unit 3 and configured to control the display 4 to display a visual content 9 on the front screen 5, and to adapt at least one dimension (i.e. width or length) of the visual content 9 to match a corresponding (i.e. parallel) first dimension 6 or second dimension 7 of the front screen 5. The visual content may be a static media content such as a digital image, or a dynamic media content such as a digital video. The visual content may also be a graphical user interface of an application running on the device 1, such as a native application or a browser configured to present web-based content. In some embodiments the visual content 9 may be configured to adapt to the available dimensions of the front screen 5 by changing an arrangement and size of elements of the web-based content, according to the principles of adaptive or responsive web design.

Figure 2:
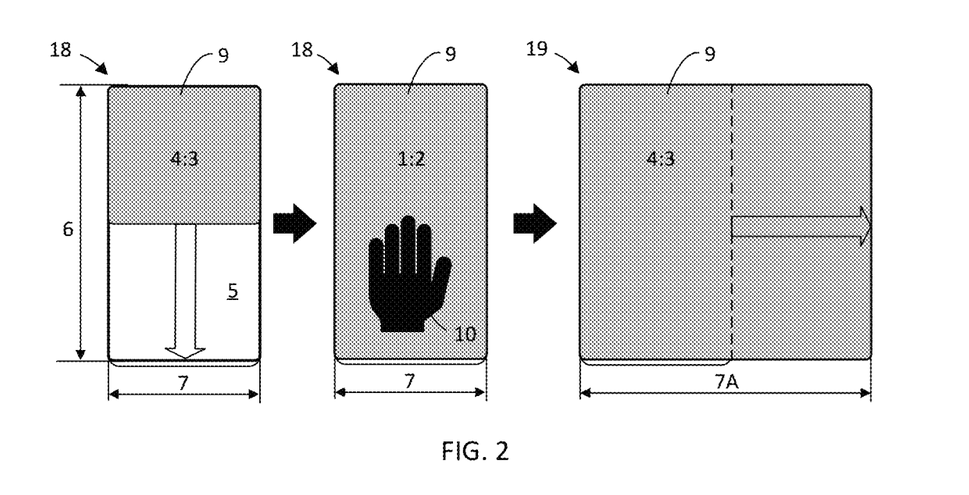
FIG. 2 shows top views of a rolling display device with displayed visual content in a rolled-in and rolled-out state in accordance with an embodiment of the first aspect.

In an embodiment as shown in FIG. 2, the controller 8 can be configured to adapt the size of the visual content 9 to match the size of the front screen 5 by dynamically adjusting the aspect ratio of the visual content 9 rendered on the front screen 5 in a way that both dimensions (i.e. width and length) of the visual content 9 match a corresponding (i.e. parallel) first dimension 6 and second dimension 7 of the front screen 5 (for example by changing the aspect ratio from 4:3 to 1:2, either by distorting the visual content 9, resizing and rearranging the elements of visual content 9, or cutting and fitting the visual content 9).

Scaling the visual content 9 to the current front dimension of the rollable touch-sensitive display 4 with height and width of the visual content 9 being fully extended allows the visual content 9 to optimally cover the current front dimension of the rollable touch-sensitive display 4. A best view of the visual content 9 is provided without any black bars on any side of a given display 4 if aspect ratio of the given display is same as that of the visual content 9. This may not always be doable for different types of visual content 9. For example, in some cases where visual content 9 is scaled to the display 4 with height fully extended, there may be black bars on the left and right side of the display 4, or in other cases where visual content 9 is scaled to the display 4 with width fully extended, there may be black bars on the top and bottom of the display 4. When there exist such black bars, another option may be adopted for aspect ratio adjustment as explained below.

As shown in FIG. 2, the controller 8 may be (further) configured to calculate an optimal second dimension 7A of the front screen 5 for displaying the visual content 9 based on the fixed first dimension 6, an aspect ratio of the visual content 9, and the orientation of the device 1 such as landscape or portrait mode, determined based on e.g. horizontal or vertical position input from a built-in tilt sensor or accelerometer in the device 1, depending on the direction the device is held. Such an accelerometer or tilt sensor is included in almost all mobile phones and digital cameras for the purpose of auto image rotation, motion-sensitive mini-games, and correcting shaking when taking photographs. In addition, the controller 8 may further use information regarding a minimum, maximum and current second dimension 7 of the front screen 5 for the calculation of the optimal second dimension 7A.

Notably, an aspect ratio of a front screen 5 of the rollable touch-sensitive display 4 is sel adaptive, meaning that it can be adjusted to be best possible aspect ratio for a given visual content 9. The aspect ratio of the front screen 5 changes continuously, which can give endless aspect ratio options to allow visual content 9 to scale completely to the front screen 5.

In particular, an adaptive aspect ratio adjuster mechanism of the controller 8 takes advantage of a form of the rollable touch-sensitive display 4 to provide the aspect ratio adjustment. The adaptive aspect ratio adjuster knows dimensions (first dimension 6 and second dimension 7) of the rollable touch-sensitive display 4 in fully rolled-out and fully rolled-in states. Therefore, the adaptive aspect ratio adjuster knows a given width and a given height of the rollable touch-sensitive display 4 in different rolling states. As the rollable touch-sensitive display 4 may be rolled in/out to various extents, the adaptive aspect ratio adjuster requires knowledge of the current front dimensions (namely, a current front width 7 and a current front height 6) of the rollable touch-sensitive display 4. The adaptive aspect ratio adjuster has this information in real time. In addition, a user of the device 1 may choose to operate the device 1 in either portrait mode or in landscape mode. Correspondingly, the rollable touch-sensitive display 4 would be oriented in either the portrait mode or in the landscape mode. Knowledge of the current orientation of the rollable touch-sensitive display 4 enables the adaptive aspect ratio adjuster to calculate best possible aspect ratio in either of the above modes.

Thereafter, the controller 8 gets visual content 9, such as image or video information (e.g., dimension, resolution of the image/video) from a media player application that renders the visual content 9.

After the controller 8 calculates the optimal second dimension 7A, it causes a rotation of the roll unit 3 using e.g. a control signal sent to the roll unit 3 to adjust the second dimension 7 of the front screen 5 by rolling in or rolling out the display 4 to match the optimal second dimension 7A.

In an embodiment, the controller 8 may be configured to, in response to detecting a user input 10, selectively enable or disable rotation of the roll unit 3 for adjusting the second dimension 7. This means that the rollable touch-sensitive display 4 is not allowed to roll to get the best possible aspect ratio without the user's permission. Any multimedia players which want to integrate this feature need to give users clear option such as a button or a gesture to enable it.

Figure 3:
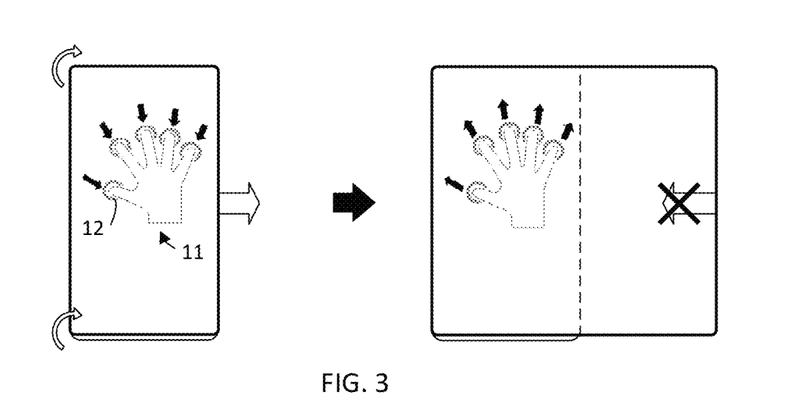
FIG. 3 shows top views of a rolling display device illustrating roll enabling and disabling gestures in accordance with a further embodiment of the first aspect.

As shown in FIG. 3, the touch-sensitive display 4 of the rollable display device 1 can be configured to detect touch gestures 11 as the user input 10. Such a touch gesture 11 can comprise a sliding movement of a plurality of touch inputs 12 detected simultaneously on the front screen 5. In an embodiment the plurality of touch inputs 12 comprises 2 or 3 touch inputs 12. In another possible embodiment the plurality of touch inputs 12 comprises 4 or 5 touch inputs 12. Defining such a minimum number of touch inputs allows for avoiding accidental rolling and unrolling of the rollable touch-sensitive display 4 on account of mistouching.

According to this embodiment, the controller 8 is further configured to, in response to detecting a pinch gesture 11 comprising a sliding movement of the plurality of touch inputs 12 towards each other, enable rotation of the roll unit 3 and thus allow adjusting the second dimension 7 by rolling the display 4 on the roll unit 3, as described above. Accordingly, the controller 8 is further configured to, in response to detecting a spread gesture 11 comprising a sliding movement of the plurality of touch inputs 12 away from each other, disable rotation of the roll unit 3 and therefore blocking any adjustment of the second dimension 7. Therefore, the described touch gesture 11 for rolling and unrolling the rollable touch-sensitive display 4 is intuitive, and the user does not need to specially memorize any complex gesture pattern for rolling and unrolling the rollable touch-sensitive display 4.

Figure 4:
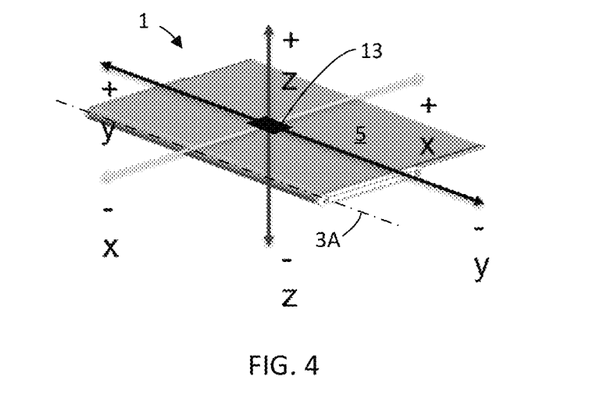
FIG. 4 shows an isometric view illustrating roll axes of a rolling display device.
Figure 5:
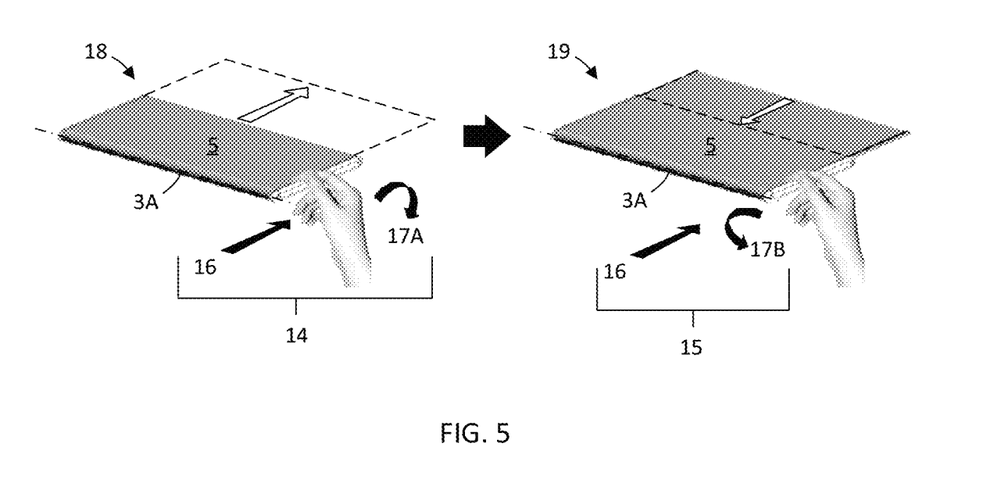
FIG. 5 shows an isometric view of movement gestures on a rolling display device in accordance with another embodiment of the first aspect.

FIGS. 4 and 5 illustrate a further embodiment of the device 1 which can be implemented separately or combined as one controller configuration.

According to an embodiment as shown in FIG. 4, the rolling display device 1 may further comprise an accelerometer 13 connected to the controller 8 and configured to detect movement gestures of the display 4. An accelerometer 13 is defined as a device that is configured to measure proper acceleration, which is the acceleration (or rate of change of velocity) of a body in its own instantaneous rest frame, in contrast to coordinate acceleration being the acceleration in a fixed coordinate system. Put another way, at any point in space-time the equivalence principle guarantees the existence of a local inertial frame, and the accelerometer 13 measures the acceleration relative to that frame. Such accelerations are popularly denoted g-force; i.e., in comparison to standard gravity.

The accelerometer 13 at rest relative to the Earth's surface will indicate approximately 1 g upwards, because the Earth's surface exerts a normal force upwards relative to the local inertial frame (the frame of a freely falling object near the surface). To obtain the acceleration due to motion with respect to the Earth, this "gravity offset" is subtracted and corrections are made for effects caused by the Earth's rotation relative to the inertial frame.

In an embodiment as illustrated in FIG. 4, the accelerometer 13 is a multi-axis accelerometer available to detect both magnitude and direction of the proper acceleration relative to 3 axes [X, Y, Z] as a vector quantity. For example, in the horizontal upwards state of the device 1 as shown in FIG. 4, the vector determined by the accelerometer is [X=0, Y=0, Z=−1]. In an embodiment the accelerometer 13 is a micromachined microelectromechanical systems (MEMS) accelerometer designed to detect the position and orientation of the device 1.

In an embodiment as illustrated in FIG. 5, the front screen 5 is configured to be adjusted by the controller 8 between a rolled-in state 18 (wherein the second dimension 7 is minimal) and a rolled-out state 19 (wherein the second dimension 7 is maximal) in response to detecting a first movement gesture 14 or a second movement gesture 15 by the accelerometer 13. In particular, the controller 8 is configured to adjust the front screen 5 to a rolled-out state 19 when detecting a first movement gesture 14, and to adjust the front screen 5 to a rolled-in state 18 in response to detecting a second movement gesture 15.

In a preferred embodiment as illustrated in FIG. 5, the first movement gesture 14 comprises a first sub-gesture 16 of arranging the display 4 in a horizontally upwards state. The controller 8 detects this initial gesture by continuously analyzing the reported acceleration values from the accelerometer 13 in all three axes. On z-axis, the reported acceleration should be close to −1 g (+/−1 is allowed), which is consistent with the initial sub-gesture pattern that the device 1 is stationary and the rollable touch-sensitive display 4 is up and kept horizontally. On x-axis and y-axis, the reported acceleration should be close to zero, which implies that the rollable touch-sensitive display 4 is kept horizontally [X=0, Y=0, Z=−g].

This is followed by a second clockwise sub-gesture 17A of shaking the display 4 by rotating in a clockwise direction around an axis parallel to the roll axis 3A while keeping the display 4 upwards and returning the display 4 to the horizontally upwards state. The controller 8 detects this shake sub-gesture by continuously analyzing the reported acceleration values from the accelerometer 13 in all three axes. On z-axis, the reported acceleration should be close to −1 g (+/−tolerance is allowed), which is consistent with the shaking sub-gesture pattern that the device 1 moves horizontally keeping the rollable touch-sensitive display 4 up. On x-axis, the acceleration increases suddenly from near zero [X=0, Y=0, Z=−g] (+/−tolerance is allowed) to a threshold [X=threshold, Y=threshold, Z=−g] and quickly decelerates back to near zero [X=0, Y=0, Z=−g] (+/−tolerance is allowed, the threshold being e.g., 1 g). On y-axis, the acceleration and deceleration change at the same time and orientation as those on x-axis.

The second movement gesture 15 comprises a similar sequence of sub-gestures but in an opposite (counter-clockwise) rotational direction, in particular a first sub-gesture 16 of arranging the display 4 in a horizontally upwards state as explained above [X=0, Y=0, Z=−g], and a second counter-clockwise sub-gesture 17B of shaking the display 4 by rotating in a counter-clockwise direction around an axis parallel to the roll axis 3A while keeping the display 4 upwards [X=−threshold, Y=−threshold, Z=−g] and returning the display 4 to the horizontally upwards state [X=0, Y=0, Z=−g] (the threshold being e.g., 1 g).

For any sub-gesture, the larger the +/−tolerance is, the more sensitive the sub-gesture recognition is. The setup of the tolerance values need to take both gesture sensitivity and misoperation into consideration.

The acceleration/deceleration change on x-axis and y-axis implies that the device 1 moves around the wrist in clockwise direction or anti-clockwise direction.

In order to avoid misoperation, the shaking sub-gesture is only valid if the device 1 is shaken horizontally while keeping the rollable touch-sensitive display 4 up.

In other words, the accelerometer 13 is sensitive to pick up slightest motions and forces applied to the device 1 by measuring linear acceleration in the x, y, z directions based on movement of the device 1. When the device 1 including the rollable touch-sensitive display 4 is shaken, the reported accelerometer 13 values are processed continuously, and the gesture is detected as a valid "shake-to-roll gesture" 14, 15 if the values conform to the specifications of the shake gesture as described above. If a user wants to roll out the rollable touch-sensitive display 4 when the rollable touch-sensitive display 4 is rolled in previously, the user can do so by holding the lower part of the device 1, keeping the rollable touch-sensitive display 4 up and horizontal, and shaking the device 1 around his/her wrist in the clockwise direction. If a user wants to roll in the display 4 when the rollable touch-sensitive display 4 is rolled out previously, the user can do so by holding the solid and lower part of the device 1, keeping the rollable touch-sensitive display 4 up and horizontal, and shaking the device 1 around his/her wrist in the anti-clockwise direction.

This shake-to-roll gesture is intuitive, as rolling/unrolling of the rollable touch-sensitive display 4 is controlled in a simple manner. Moreover, the shake-to-roll gesture is a low power consumption solution for rolling the rollable touch-sensitive display 4 as it only uses the accelerometer 13 to detect motion. The shake-to-roll gesture is understood to have a strong dependency on smartphones having rollable touch-sensitive displays 4. The same shake-to-roll gesture cannot be used on other types of smartphones (for example, such as bar smartphones, foldable smartphones, and the like) without changing their principle ideas.

Figure 6:
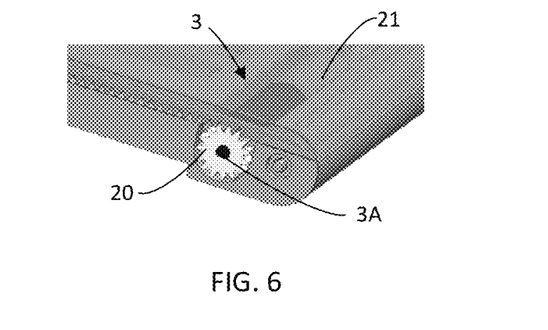
FIG. 6 shows a 3D side view illustrating the gear and drive unit of a rolling display device in accordance with an embodiment of the first aspect.

FIG. 6 shows a 3D side view illustrating the gear and drive unit of a rolling display device in accordance with an embodiment of the first aspect, wherein the roll unit 3 further comprises a gear 20 arranged on both ends of the roll unit 3 for engaging the display 4 and a reversible drive unit 21 configured to rotate the roll unit 3 around the roll axis 3A in response to e.g. control signals received from the controller 8, the control signals comprising instructions defining a direction and an extent of the rotation. Such a reversible drive unit 21 (motor) is capable of providing bidirectional rotational motion to a rollable touch-sensitive display 4. The reversible drive unit 21, gears 20 and gear shaft together form a rolling mechanism (roll unit 3) of the rollable touch-sensitive display 4. The drive unit 21 can be controlled by giving signals to have two-way rotation with high precision (up to millimeter precision). Higher the voltage given to the drive unit 21, faster is the movement of the gear shaft, which drives the rollable display 4 to roll faster. Moreover, rolling orientation, moving distance, and rolling speed can be controlled by the giving right signals to the reversible drive unit 21.

In a possible embodiment, the drive unit 21 is an electric motor configured to further adjust a rotational speed of the roll unit 3 in proportion to an input voltage.

Figure 7:
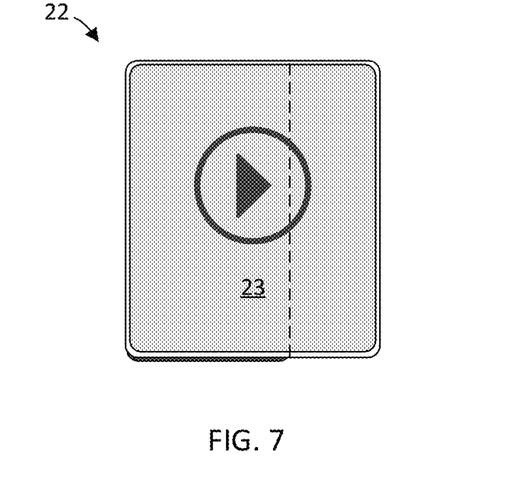
FIG. 7 shows a top view illustrating a rollable display smartphone device in accordance with another embodiment of the first aspect.

In a possible embodiment as shown in FIG. 7, the device 1 is a smart device, preferably a smartphone 22. The controller 8 of such embodiments may further configured to provide a graphical user interface 23 on the front screen 5 of the display 4, the graphical user interface 23 being adjusted, as explained above, in response to the front screen size. In further optional embodiments, the rollable touch sensitive display 4 could be a part of other smart devices such as smart televisions, smart watches, and the like.

Figure 8:
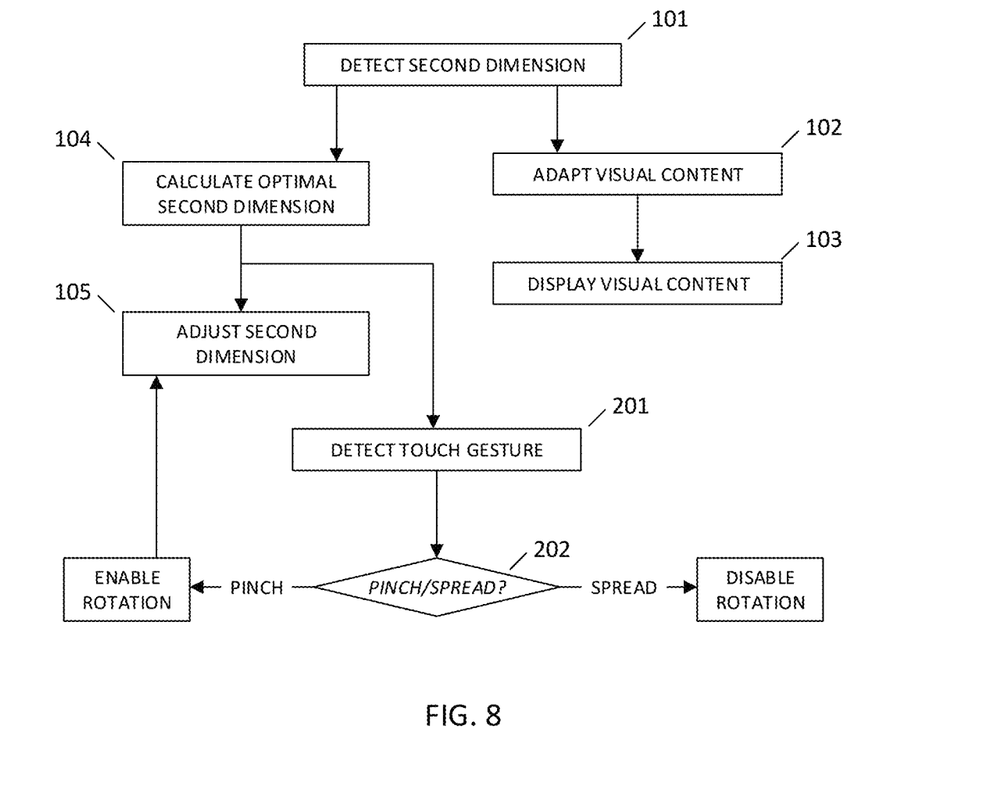
FIG. 8 shows a flow chart illustrating a method of controlling a rolling display device in accordance with an embodiment of the second aspect.
Figure 9:
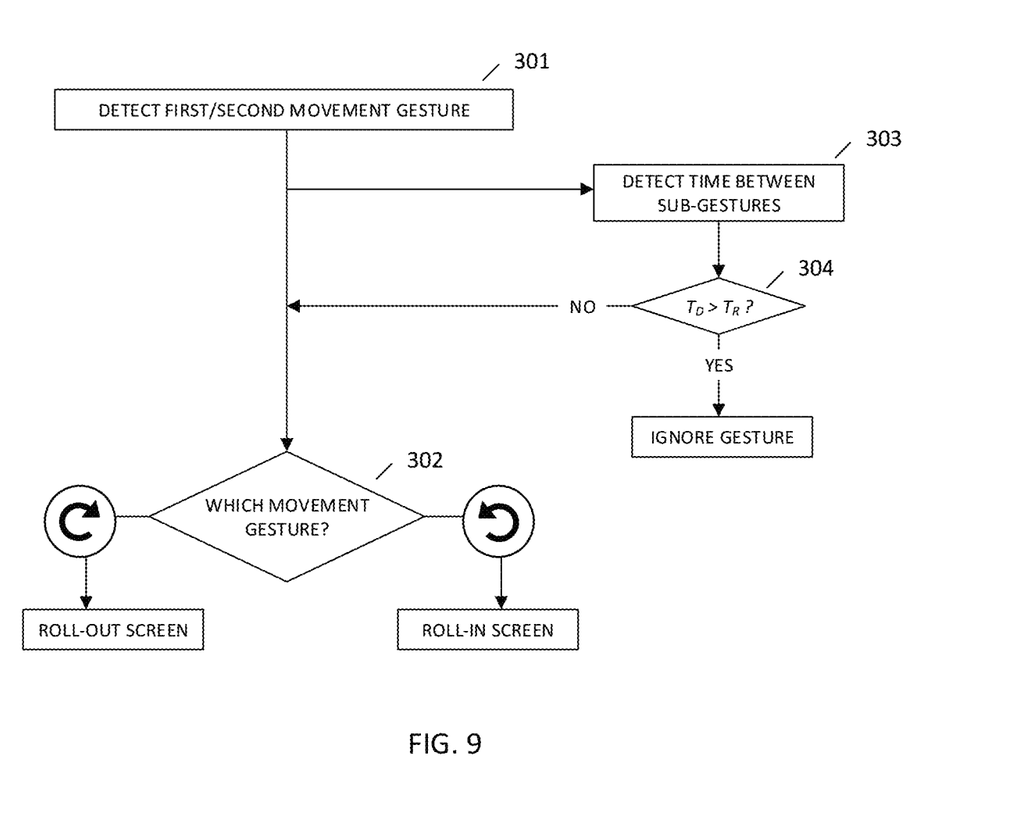
FIG. 9 shows another flow chart illustrating a method of controlling a rolling display device in accordance with a further embodiment of the second aspect.

FIGS. 8 and 9 show flow diagrams illustrating the functioning of the rolling display device 1 according to the above described configurations of the controller 8, which can be implemented separately or combined as one controller configuration.

In a first step 101, a current second dimension 7 of the front screen 5 is detected as described above, based on the current degree of rotation of the roll unit 3.

In a next step 102, at least one dimension of a visual content 9 to be displayed on the front screen 5 is adapted to match a corresponding dimension of the front screen 5, after which, in a final step 103, the visual content 9 is displayed on the front screen 5 with the new, adapted dimensions.

This adaptive aspect ratio adjuster enables adjustment of the aspect ratio of the visual content 9 in accordance with current front dimensions of the rollable touch-sensitive display 4. Therefore, the rollable touch-sensitive display 4 is not limited to fixed aspect ratios, but in fact the aspect ratio of the visual content 9 can be changed by rolling the rollable touch-sensitive display 4. This enables provision of many aspect ratio options at the rollable touch-sensitive display 4 to fit aspect ratios of various images and videos and provide an improved user experience. This makes it also possible that the screen aspect ratio can adapt to new aspect ratios which may arise in the future. Moreover, this allows for full utilization of bezel-less displays in a manner that there are no black bars on any edge of the displays, which could provide users with the best possible visual experience.

In a further embodiment rolling display device 1 may function (separately or combined as one controller configuration with the above described functioning) by adjusting the size of the front screen 5 to the aspect ratio of the visual content 9.

According to this embodiment, in an initial step 104, an optimal second dimension 7A is calculated, based on the fixed first dimension 6, an orientation of the display 4, and an aspect ratio of the visual content 9, for displaying the visual content 9, as described above in relation to FIG. 2.

In a next step 105, the second dimension 7 of the front screen 5 is adjusted by rotating the roll unit 3 to the optimal second dimension 7A, as shown in FIG. 2. In other words, according to a combined controller configuration of the device 1, either the visual content 9 is optimally scaled to current dimensions of the front screen 5, or the rollable touch-sensitive display 4 is rolled (optionally after obtaining the user's permission as explained below) to a required extent that optimally displays a best possible aspect ratio for the visual content 9.

According to yet another embodiment of the rolling display device 1 (implemented either separately or combined as one controller configuration with the above described functioning, as shown in FIG. 8) the touch-sensitive display 4 is configured detect touch gestures 11. According to this embodiment, in an initial step 201, a touch gesture 11 comprising a simultaneous sliding movement of a plurality of touch inputs 12 is detected on the front screen 5.

In some embodiments at least two simultaneous touch inputs 12 need to be detected for a valid touch gesture 11. In further possible embodiments at least 3, 4 or 5 simultaneous touch inputs 12 need to be detected for a valid touch gesture 11. In other words, in order to enable or disable rolling of the touch-sensitive display 4, a user is required to tap the front screen 5 using multiple fingers and move (slide) the multiple fingers across the front screen 5 towards each other or away from each other. Such gestures are also commonly referred to as "spreading" and "pinching. The touch gesture 11 can thus be understood to be a multi-finger touch (pinch or spread) gesture. This gesture requiring multiple fingers is rarely used on smart devices and is therefore quite unique and helps avoiding accidental or unwanted roll of the display 4.

In a next step 202 the controller 8 determines whether the sliding movement of the touch inputs 12 was detected as a pinch or spread gesture and selectively enables or disables rotation of the roll unit 3 for adjusting the second dimension 7 based on which touch gesture 11 was detected. In particular, in response to detecting a pinch gesture comprising a sliding movement of the plurality of touch inputs 12 towards each other (or a palm of a user) the rotation of the roll unit 3 is enabled, and in response to detecting a spread gesture comprising a sliding movement of the plurality of touch inputs 12 away from each other (or a palm of a user) the rotation of the roll unit 3 is disabled.

In an embodiment, the controller 8 may further determine the pinch or spread gesture based on the detected number of touch inputs 12, such as 2, 3, 4 or 5 touch inputs 12.

In a further embodiment, the touch gestures 11 may be determined as valid only if a media player application running on the device 1 that renders the visual content 9 supports an adaptive aspect ratio adjuster and the visual content 9 is actively on the front screen 5.

Accordingly, in a preferred embodiment, only when the predefined constraints are satisfied (number of touch inputs 12, input detection on the front screen 5, pinch or spread gesture, adaptive aspect ratio adjuster support and visual content 9 on front screen 5) are the given touch gestures 11 deduced to be valid for enabling/disabling rolling of the rollable touch-sensitive display 4.

FIG. 9 illustrates another embodiment of the rolling display device 1 (implemented either separately or combined as one controller configuration with the above described functioning), wherein the rolling display device 1 comprises an accelerometer 13 connected to the controller 8, as described above with respect to FIG. 4. The steps according to the controller configuration are explained below.

In an initial step 301 the accelerometer 13 detects a first movement gesture 14 or a second movement gesture 15.

In a following step 302, the front screen 5 is adjusted by the controller 8 between a rolled-in state 18 wherein the second dimension 7 is minimal, and a rolled-out state 19 wherein the second dimension 7 is maximal, based on which movement gesture was detected. In particular, in response to detecting a first movement gesture 14 by the accelerometer 13 the front screen 5 is adjusted to a rolled-out state 19, and in response to detecting a second movement gesture 15 by the accelerometer 13 the front screen 5 is adjusted to a rolled-in state 18.

In a preferred embodiment the first movement gesture 14 comprises a first sub-gesture 16 of arranging the display 4 in a horizontally upwards state, and a second clockwise sub-gesture 17A of shaking the display 4 by rotating in a clockwise direction around an axis parallel to the roll axis 3A while keeping the display 4 upwards and returning the display 4 to the horizontally upwards state. In contrast, the second movement gesture 15 comprises the same first sub-gesture 16 of arranging the display 4 in a horizontally upwards state, but an inverse second counter-clockwise sub-gesture 17B of shaking the display 4 by rotating in a counter-clockwise direction around an axis parallel to the roll axis 3A while keeping the display 4 upwards and returning the display 4 to the horizontally upwards state.

According to an embodiment (implemented either separately or combined as one controller configuration with the above described functioning, as shown in FIG. 9) in a further step 303 a time interval Td elapsed between the first sub-gesture 16 and the respective second sub-gesture (a second clockwise sub-gesture 17A or a second counter-clockwise sub-gesture 17B) is detected; and in a following step 304 the controller 8 determines whether the first movement gesture 14 and the second movement gesture 15 should be interpreted as valid. The gestures 14, 15 are only interpreted as valid if the time interval Td is equal or shorter than a predefined time threshold Tr, otherwise they are ignored.

In particular, the device 1 records the exact time when the above sub-gestures 16, 17A/17B are recognized. Every time when the device 1 recognizes the first sub-gesture 16, it records a time (ti) to milliseconds and updates it continuously. Likewise, the device 1 records a time (ts) of the shaking sub-gesture 17A/17B to milliseconds upon detecting the shaking sub-gesture 17A/17B.

A time interval Td between the first sub-gesture 16 and the shaking sub-gesture 17A/17B is calculated as: Td=ts−ti.

When the time interval Td is greater than a threshold Tr (for example, such as 500 milliseconds), it implies that the two sub-gestures are not coherent. In such a case, the rollable touch-sensitive display 4 is not rolled in or rolled out (notably, no further action is taken). Otherwise, when the time interval Td is equal to or lesser than the threshold Tr it is implied that the two sub-gestures are coherent. In such a case, the rollable touch-sensitive display 4 is rolled in or rolled out according to the direction of the shaking sub-gesture 17A/17B.

Td is a key parameter used to determine the coherency of the two sub-gestures. A smaller Td requires users to follow the shake-to-roll gesture constraints more strictly. A larger Td offers more tolerance to recognize the user's gesture. In practice, Td needs to be selected carefully so that it can balance the success rate of gesture recognition and misoperation.

Accordingly, in a preferred embodiment, only when the above constraints are satisfied (direction and sequence of sub-gestures, time interval between sub-gestures) are the given movement gestures deduced to be valid for controlling rolling of the rollable touch-sensitive display 4. In other words, when the two sub-gestures 16, 17 are coherent, the rollable touch-sensitive display 4 is rolled in or rolled out, otherwise no further action is taken.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

The invention claimed is:

1. A device comprising:
   a housing;
   a roll unit mounted in the housing and configured to be rotatable around a roll axis;
   a flexible touch-sensitive display configured to be rolled around said roll unit and to define a planar front screen having a fixed first dimension and a second dimension that changes according to a degree of rotation of said roll unit;
   a controller configured to control said display to:
      display a visual content on said front screen;
      calculate an optimal second dimension of said front screen for displaying said visual content based on said fixed first dimension, an orientation of said display, and an aspect ratio of said visual content; and
      adjust, by causing a rotation of said roll unit, the second dimension of said front screen to said optimal second dimension; and
   an accelerometer connected to said controller and configured to detect movement gestures of said display;
   wherein said front screen is configured to be adjusted by said controller between a rolled-in state in which said second dimension is minimal, and a rolled-out state in which said second dimension is maximal; and
   wherein said controller is further configured to
      in response to the accelerometer detecting a first movement gesture, adjust said front screen to a rolled-out state, and
      in response to the accelerometer detecting a second movement gesture, adjust said front screen to a rolled-in state;
   wherein the first movement gesture comprises:
      a first sub-gesture of arranging said display in a horizontally upwards state, and
      a second sub-gesture of shaking said display by rotating in a clockwise direction around an axis parallel to said roll axis while keeping said display upwards and returning the display to said horizontally upwards state;
   wherein said second movement gesture comprises:
      said first sub-gesture, and
      a third sub-gesture of shaking said display by rotating in a counter-clockwise direction around an axis parallel to said roll axis while keeping said display upwards and returning the display to said horizontally upwards state; and
   wherein the controller is configured to:
      detect a time interval Td elapsed between said first sub-gesture and said second sub-gesture or said third sub-gesture, to
      interpret said first movement gesture valid only if said time interval Td between the first sub-gesture and the second sub-gesture is equal or shorter than a predefined time threshold Tr, and to
      interpret said second movement gesture as valid only if said time interval Td between the first sub-gesture and the third sub-gesture is equal or shorter than a predefined time threshold Tr.

2. The device according to claim 1, wherein said controller is configured to adapt a size of said visual content to match a size of said front screen by adjusting an aspect ratio of said visual content so that respective dimensions of said visual content match a corresponding first dimension and second dimension of said front screen.

3. The device according to claim 1, wherein said controller is configured to, in response to detecting a user input, selectively enable or disable rotation of said roll unit for adjusting said second dimension.

4. The device according to claim 3, wherein said display is configured to detect touch gestures, and said user input comprises a touch gesture detected on said front screen.

5. The device according to claim 4, wherein said touch gesture comprises a sliding movement of a plurality of touch inputs detected simultaneously on said front screen; and wherein the controller is further configured to
   in response to detecting a pinch gesture comprising a sliding movement of the plurality of touch inputs towards each other, enable rotation of said roll unit for adjusting said second dimension, and
   in response to detecting a spread gesture comprising a sliding movement of the plurality of touch inputs away from each other, disable rotation of said roll unit for adjusting said second dimension.

6. The device according to claim 1, wherein said roll unit further comprises
   a gear, arranged on both ends of said roll unit, configured to engage said display; and
   a reversible drive unit configured to rotate said roll unit around said roll axis in response to control signals received from said controller, said control signals comprising instructions defining a direction and an extent of said rotation.

7. The device according to claim 6, wherein said drive unit is an electric motor configured to further adjust a rotational speed of said roll unit in proportion to an input voltage.

8. The device according to claim 1, wherein said device is a smart device, and wherein said visual content is displayed as part of a graphical user interface of an application running on said smart device.

9. The device according to claim 8, wherein said visual content is video content with a fixed aspect ratio.

10. A method for controlling a rolling display device, said rolling display device comprising a controller, a housing, a roll unit mounted in the housing and configured to be rotatable around a roll axis, a flexible, touch-sensitive display rolled around said roll unit and defining a planar front screen having a fixed first dimension and a second dimension that changes according to a degree of rotation of said roll unit, and an accelerometer connected to said controller, the method comprising:
   calculating, by said controller, an optimal second dimension for displaying a visual content based on said fixed first dimension, an orientation of said display, and an aspect ratio of said visual content;
   adjusting, by rotating said roll unit, the second dimension of said front screen to said optimal second dimension; and
   displaying said visual content on said front screen;
   detecting a first movement gesture or a second movement gesture by said accelerometer; and
   adjusting said front screen by said controller between a rolled-in state wherein said second dimension is minimal, and a rolled-out state wherein said second dimension is maximal; wherein in response to the accelerometer detecting a first movement gesture, said front screen is adjusted to a rolled-out state, and
in response to the accelerometer detecting a second movement gesture, said front screen is adjusted to a rolled-in state;
wherein the first movement gesture comprises:
a first sub-gesture of arranging said display in a horizontally upwards state, and
a second sub-gesture of shaking said display by rotating in a clockwise direction around an axis parallel to said roll axis while keeping said display upwards and returning the display to said horizontally upwards state;
wherein said second movement gesture comprises:
said first sub-gesture, and
a third sub-gesture of shaking said display by rotating in a counter-clockwise direction around an axis parallel to said roll axis while keeping said display upwards and returning the display to said horizontally upwards state; and
wherein the method further comprises:
detecting a time interval Td elapsed between said first sub-gesture and said second sub-gesture or said third sub-gesture, to
interpreting said first movement gesture valid only if said time interval Td between the first sub-gesture and the second sub-gesture is equal or shorter than a predefined time threshold Tr, and to
interpreting said second movement gesture as valid only if said time interval Td between the first sub-gesture and the third sub-gesture is equal or shorter than a predefined time threshold Tr.

11. The method according to claim 10, wherein said touch-sensitive display is configured detect touch gestures, and wherein the method further comprises:
detecting a touch gesture comprising a simultaneous sliding movement of a plurality of touch inputs on said front screen; and
selectively enabling or disabling rotation of said roll unit for adjusting said second dimension based on said touch gesture, wherein
in response to detecting a pinch gesture comprising a sliding movement of the plurality of touch inputs towards each other, rotation of said roll unit is enabled, and
in response to detecting a spread gesture comprising a sliding movement of the plurality of touch inputs away from each other, rotation of said roll unit is disabled.

12. The device according to claim 8, wherein said smart device is a smartphone.

13. A device comprising:
a housing;
a roll unit mounted in the housing and configured to be rotatable around a roll axis;
a flexible touch-sensitive display configured to be rolled around said roll unit and to define a planar front screen having a fixed first dimension and a second dimension that changes according to a degree of rotation of said roll unit;
a controller configured to control said display to display a visual content on said front screen, and to adapt at least one dimension of said visual content to match a corresponding dimension of said front screen;
an accelerometer connected to said controller and configured to detect movement gestures of said display;
wherein said front screen is configured to be adjusted by said controller between a rolled-in state in which said second dimension is minimal, and a rolled-out state in which said second dimension is maximal;
wherein the controller is further configured to:
in response to the accelerometer detecting a first movement gesture, adjust said front screen to a rolled-out state; and
in response to the accelerometer detecting a second movement gesture, adjust said front screen to a rolled-in state;
wherein said first movement gesture comprises:
a first sub-gesture of arranging said display in a horizontally upwards state, and
a second sub-gesture of shaking said display by rotating in a clockwise direction around an axis parallel to said roll axis while keeping said display upwards and returning the display to said horizontally upwards state;
wherein said second movement gesture comprises:
said first sub-gesture; and
a third sub-gesture of shaking said display by rotating in a counter-clockwise direction around an axis parallel to said roll axis while keeping said display upwards and returning the display to said horizontally upwards state; and
wherein said controller is configured to:
detect a time interval Td elapsed between said first sub-gesture and said second sub-gesture or said third sub-gesture, to
interpret said first movement gesture valid only if said time interval Td between the first sub-gesture and the second sub-gesture is equal or shorter than a predefined time threshold Tr, and to
interpret said second movement gesture as valid only if said time interval Td between the first sub-gesture and the third sub-gesture is equal or shorter than a predefined time threshold Tr.

* * * * *